United States Patent Office 3,008,997
Patented Nov. 14, 1961

3,008,997
HETEROCYCLIC ORGANOBORINES
Klaus A. Saegebarth, Christiana Hundred, Del., assignor to E. I. du Pont de Nemours and Company, Wilmington, Del., a corporation of Delaware
No Drawing. Filed July 14, 1958, Ser. No. 748,158
7 Claims. (Cl. 260—606.5)

This invention relates to novel organoborine compounds and more particularly to heterocyclic organoborines which are prepared from diborane.

It is an object of the present invention to provide new heterocyclic organoborines. A further object is to provide heterocyclic organoborines which are highly useful in that they may be converted into diols. A still further object is to provide a process for the preparation of the heterocyclic organoborines from diborane and alkadiene type compounds. Other objects will appear hereinafter.

These and other objects of this invention are accomplished by the novel organoborines having the structure

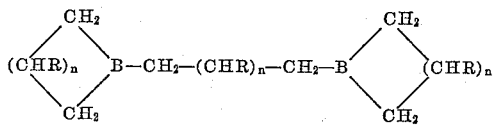

wherein R is a radical selected from the group consisting of hydrogen, alkyl and aryl and $n$ is an integer from 2 to 4.

The novel organoborines of the present invention may be prepared by contacting diborane which has the formula $B_2H_6$ with an alkadiene having the structure

wherein R has the significance defined above and $m$ is an integer from 0 to 2. The reaction between the diborane and the alkadiene should be carried out in the presence of aliphatic ether in an inert solvent.

The diborane which is used in preparing the novel organoborines of the present invention may be prepared by adding a solution of sodium borohydride to a solution of boron trifluoride etherate. This method of preparation is more particularly described in "Journal of Organic Chemistry," vol. 22, page 1137 (1957). The sodium borohydride and boron trifluoride etherate solution is preferably made using the dimethyl ether of diethylene glycol as a solvent. If desired, tetrahydrofuran or diethyl ether or di-n-butyl ether may be used as the solvent. The use of sodium borohydride is preferred since it is one of the most readily available borohydride reagents, however, other compounds such as potassium borohydride, lithium borohydride, calcium borohydride, or magnesium borohydride can be used. Also, the use of boron trifluoride etherate is preferred because here again it is a readily available liquid. However, in general, the etherates of any acyclic low molecular weight aliphatic ether with boron trifluoride may be used. In preparing the diborane the solution of sodium borohydride is added to the solution of boron trifluoride etherate just fast enough to maintain gentle gas evolution. The formation of diborane is quite exothermic. It is to be understood that other methods of preparation can be used for the diborane such as reacting boron trifluoride with lithium aluminum hydride.

Alkadienes which can be used in preparing the novel organoborines of the present invention should have 2 carbon-to-carbon double bonds which are not on adjacent carbon atoms and which conform to the general formula set forth above. These compounds may also be referred to as alkenes. Representative compounds include butadiene-1,3; 2-methyl-butadiene-1,3; 2-ethyl-butadiene-1,3; 2-butyl-butadiene-1,3; 2-heptyl-butadiene-1,3; 2-phenyl-butadiene-1,3; 2,3-dimethyl-butadiene-1,3; 2-ethyl-3-methyl-butadiene-1,3; 2,3-diphenyl-butadiene-1,3; 2,3-di-p-tolyl-butadiene-1,3; pentadiene-1,4; 2-methyl-pentadiene-1,4; 3-methyl-pentadiene-1,4; 2,4-dimethyl-pentadiene-1,4; heaxdiene-1,5; 2-methyl-hexadiene-1,5; 3-methyl-heaxdiene-1,5; 2,5-dimethyl-hexadiene-1,5; 3,4-dimethyl-hexadiene-1,5; 3,4-diethyl-hexadiene-1,5; 2-isopropyl-5-methyl-hexadiene-1,5; and 3-methyl-4-phenyl-hexadiene-1,5. In general any alkadiene may be used wherein the substituents are not reactive with the diborane, i.e., not reduced by diborane under the conditions of the reaction. Substituents which should be avoided include aldehydes, ketones, lactones, azo groups, epoxides, cyclopropane rings, nitriles and groups bearing Zerewitinoff active hydrogen atoms.

In preparing the organoborines the diborane is introduced into a reaction vessel where it contacts the alkadiene which is generally dissolved in an inert solvent. An inert atmosphere must be preserved during the preparation of the organoborines because diborane may burst into flame or explode when contacted with air. Highly purified argon is satisfactory as an inert atmosphere, but other equally inert gases such as highly purified nitrogen may be used. Before the diborane is introduced into the reaction vessel all traces of air are thoroughly swept from the reaction system and a positive pressure is maintained by inflow of the inert gas until all the alkadiene and diborane have reacted and any residual diborane has been removed from the system.

The reaction between the diborane and the alkadiene must be carried out in the presence of an aliphatic ether. Essentially any aliphatic ether may be used which will coordinate with diborane. Dialkyl ethers are preferred such as diethyl ether, diisopropyl ether, and di-n-butyl ether or cyclic alkylene ethers such as tetrahydrofuran. The amount of aliphatic ether employed should be at least about 2 moles per mole of diborane used since it has been determined that when a lower proportion of aliphatic ether is used, the conversion of the alkadiene to the organoborine is very low.

In addition to the aliphatic ether, an inert solvent such as an aliphatic hydrocarbon solvent may be used as a diluent for the reaction of the diborane with the alkadiene. Any solvent may be used which is inert to the reactants and which boils low enough to be easily removed after the organoborine has formed. Representative solvents include pentane, which is preferred, cyclohexane, isooctane and n-decane. If desired, the aliphatic ethers described above for the reaction of the diborane with the alkadiene may be employed. In this instance the ether serves both as a promoter and a solvent. Other ethers which may be used include the dimethyl ether or diethyl ether of diethylene glycol. The solvent, in order that it not interfere with formation of the organoborine, should be free of any groups which may be reduced by diborane under the conditions of the reaction.

In preparing the organoborines there should be used about 3 moles of the alkadiene for every mole of the diborane since it has been determined that when the reactants are not employed in these proportions the yield of the desired organoborines decreases. As noted above, the formation of organoborine is quite exothermic. In general the reaction of the diborane and the alkadiene is carried out at atmospheric pressure at a temperature not far above the boiling point of the alkadiene. It is to be understood that the process may be operated at superatmospheric pressure. The temperatures at which satisfactory results have been achieved range from about −20° C. to about 100° C. After the diborane-alkadiene reaction is completed the resulting organoborine is obtained by concentrating the solution obtained under vacuum. The resulting organoborine should be stored under an inert atmosphere such as argon or nitrogen.

The novel organoborines of the present invention dissolve easily in common solvents such as ethanol, pentane and diethyl ether. Some of these organoborines are clear mobile liquids, others are low melting solids. In general these organoborines react readily with oxygen and those which have a high vapor pressure may spontaneously ignite when contacted with air. On burning, all of these organoborines display the characteristic green flame of boron compounds.

The novel organoborines of the present invention have a wide variety of uses. They are particularly useful in the preparation of diols. Thus the alkadiene which is used to prepare these organoborines may be converted to the corresponding diol by utilizing the organoborine as an intermediate product. This conversion of the alkadiene using the organoborine as an intermediate results in a relatively pure bifunctional hydroxy compound and it will be readily appreciated that these diols have a wide variety of uses. They are solvents for essential oils, resins, dyestuffs and gums. They can be employed as components for brake fluids and as heat transfer liquids. They are blending agents and coupling agents for cutting oils and dry-cleaning soaps.

In preparing a diol from the organoborines each molecule of the organoborine is oxidized with 3 moles of molecular oxygen (or its equipvalent provided by an oxygen-bearing oxidizing agent) to obtain an intermediate which may then be hydrolized to the diol. This oxidation and hydrolysis may be conveniently carried out in one stage by introducing 30% aqueous hydrogen peroxide to a basic ethanolic solution of the organoborine. Alternatively, air or oxygen can be introduced into an anhydrous solution of the organoborine in a solvent that is not readily oxidized, such as tertiary butyl alcohol or pentane. Water is then added after the introduction of air or oxygen has been completed.

When the oxidation and hydrolysis is carried out in one step, a 30% aqueous hydrogen peroxide is added to a solution of the organoborine in ethanol containing about 5–10% by weight of sodium hydroxide. About 2 moles of base are present for every mole of organoborine. Since the oxidation is very exothermic, the peroxide solution is added at a rate just sufficient to maintain reflux. A slight excess of peroxide may be required before the reaction mixture displays a positive starch iodide test. When enough peroxide has been added the mixture is cooled and decanted from the precipitated sodium borate. The mixture is neutralized with acetic acid, dried, and distilled to isolate the product diol. The preparation of the diol corresponding to the alkadiene which is used to prepare the organoborine is more particularly illustrated in the examples. The preparation of diols from alkadienes using organoborines as intermediates is more particularly described and claimed in my copending application Serial No. 748,159, filed July 14, 1958, now abandoned.

The following examples will better illustrate the nature of the present invention; however, the invention is not intended to be limited to these examples. Parts are by weight unless otherwise indicated.

*Example 1*

Two reaction vessels are used. Diborane is generated in the first and contacted with the alkadiene in the second. Argon gas is swept through both vessels to displace air as completely as possible before the reaction is begun. A continual argon sweep is maintained during the reaction to maintain a positive pressure in the system. The exit vent of the second reactor is connected to a bubbler tower containing acetone; any diborane displaced from the second reactor is destroyed as it emerges from the bubbler tube below the surface of the acetone. After the reaction has been completed, argon is swept through the reaction vessels for several hours to remove residual diborane.

Into the first vessel are poured 50 milliliters of the dimethyl ether of diethylene glycol and 25 milliliters of boron trifluoride:diethylether complex. Into the second vessel are introduced with agitation 100 milliliters of anhydrous ether and 150 milliliters of anhydrous pentane. External cooling is applied and the temperature of the well-stirred solution is lowered to about 2° C.

Diborane is generated by adding 240 milliliters of a 0.75 M sodium borohydride solution in the dimethyl ether of diethylene glycol to the first vessel with agitation over a one hour period. The diborane is swept into the second vessel where it is admitted by a bubbler outlet positioned below the surface of the solution contained therein. When the diborane begins to enter, 25 milliliters of butadiene-1,3 is added with stirring to the chilled solution in the second flask in about 6 minutes. About 15 milliliters of the sodium borohydride solution have been used at this point; the remaining 225 milliliters is subsequently introduced in about 54 minutes while agitation is continually maintained and the temperature in the second vessel is kept between about 2 to 10.5° C. After standing at room temperature for about 16 hours, the solution containing the organoborine is removed from the second vessel and concentrated under vacuum to yield 15.7 grams of a clear, colorless, oily liquid which boils at 113–115° C. (9 mm. Hg) and bursts into a green flame on exposure to air. The organoborine is 1,4-bis(1-boracyclopentyl)butane and corresponds to the formula

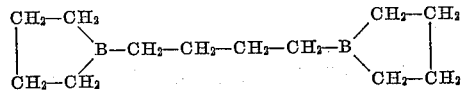

This organoborine can be used to prepare butane-1,4-diol. A reaction vessel is employed equipped with an agitator and a condenser. 6.4 grams of sodium hydroxide is dissolved with stirring in 150 milliliters of ethyl alcohol. The organoborine prepared above is then dissolved with agitation in this basic solution. During a 5-hour period 70 milliliters of 30% hydrogen peroxide is added cautiously with stirring. The heat evolved brings the mixture to reflux. When the addition is finished, the mixture is allowed to cool. A pasty white solid precipitates. The clear supernatant liquid is decanted. The precipitate is washed three times with 75 milliliters of a 50/50 diethyl ether-chloroform mixture. The combined organic phases, which display a pH of about 7.5, are neutralized with acetic acid and subsequently dried over magnesium sulfate. The solvent is allowed to evaporate and the clear colorless viscous residue is fractionally distilled. 14.05 grams of 1,4-butanediol is obtained melting at 15.5–17° C. and boiling at 99–101° C. (2.3–3.0 mm. Hg). Its $n_D^{20}$ is 1.4430.

0.5 gram of the 1,4-butanediol and 1.2 grams of phenyl isocyanate are mixed and heated on a steam bath for several minutes. White crystals separate on cooling. After recrystallization from benzene they melt at 182–183° C. alone or when mixed with an authentic sample of the bisphenylurethane of 1,4-butanediol.

It is quite apparent from this example that the organoborine provides a convenient intermediate for preparing an alkane diol from the corresponding alkadiene.

*Example 2*

1,4 - bis(1-bora-3-methylcyclopentyl) - 2 - methylbutane

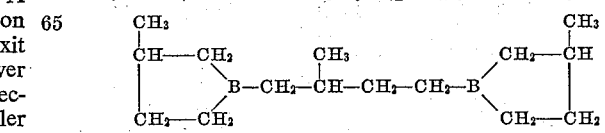

is made from isoprene by a procedure similar to that described in Example 1 for 1,4-bis(1-boracyclopentyl)butane except that the diborane is reacted with the diene at 20 to 28° C. instead of 2 to 10.5° C.

20.4 grams of isoprene is reacted with 2.77 grams of diborane generated by mixing 240 milliliters of the 0.75 M sodium borohydride solution and the solution containing 25 milliliters of boron trifluoride:ether complex. 14.7 grams of the liquid organoborine is obtained.

This organoborine is dissolved in 100 milliliters of ethanol containing 6.4 grams of sodium hydroxide. Over a 3-hour period 45 milliliters of 30% hydrogen peroxide is introduced with stirring. 12.5 grams of 2-methyl-1,4-butanediol, B.P. 107–109° C. (4.5 mm. Hg), is isolated by a procedure similar to that described in Example 1.

*Example 3*

The apparatus and the protective atmosphere of argon described in Example 1 are used here.

Over a period of about 40 minutes 16.2 grams of butadiene-1,3 and about 2.77 grams of diborane are introduced with stirring into 200 milliliters of tetrahydrofuran maintained at a temperature between 5 to 7° C. The diborane is generated during this reaction by adding a solution of 5.57 grams of sodium borohydride in 120 milliliters of the dimethyl ether of diethylene glycol with stirring to a solution of 28.4 grams of boron trifluoride:diethyl ether complex in 50 milliliters of the dimethyl ether of diethylene glycol.

The tetrahydrofuran solution is allowed to stand at room temperature for 16 hours. It is then concentrated under vacuum to yield 15.5 grams of 1,4-bis(1-boracyclopentyl)butane. The clear, colorless oil fumes violently on exposure to air and gives a positive flame test (green color) for boron.

The above organoborine is dissolved with stirring in 100 milliliters of an ethanol solution containing 6.4 grams of sodium hydroxide. Then 60 milliliters of 30% aqueous hydrogen peroxide is introduced over a 1.5-hour period at a rate sufficient to maintain gentle reflux. The mixture displays a negative starch iodide test until 10 additional milliliters of 30% aqueous hydrogen peroxide is added.

The reaction mixture is allowed to cool. A white pasty water-soluble solid separates. The supernatant liquid is decanted, the solid is thrice washed with 75-ml. portions of ether, the combined organic layers (pH=7.5) are neutralized with acetic acid and dried over anhydrous magnesium sulfate. The solvent is removed to yield 13.5 grams of 1,4-butanediol, B.P. 110–112° C. (6 mm. Hg), melting at 14.5–17° C.

*Example 4*

1,4 - bis(1-bora-3,4-dimethylcyclopentyl)-2,3-dimethylbutane

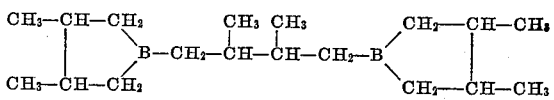

is made from 2,3-dimethylbutadiene-1,3 by a procedure similar to that described in Example 1 for 1,4-bis(1-boracyclopentyl)-butane except that the diborane is reacted with the diene at 14 to 30.5° C. instead of 2 to 10.5° C.

24.6 grams of 2,3-dimethylbutadiene-1,3 is reacted with 2.77 grams of diborane generated by mixing 200 milliliters of a 1.0 M sodium borohydride solution and 23.1 grams boron trifluoride ether complex in 50 milliliters of the dimethyl ether of diethylene glycol. 27.5 grams of the organoborine is obtained, B.P. 109–110° C. (0.9 mm. Hg). It is a colorless mobile liquid which fumes when exposed to air and burns with a green flame.

This organoborine is dissolved in 125 milliliters of ethanol containing 8 grams of sodium hydroxide. Over a one-hour period 81.6 grams of 30% hydrogen peroxide is introduced with stirring. 18.1 grams of 2,3-dimethyl-1,4-butanediol is isolated, B.P. 122–124° C. (10 mm.). The $n_D^{20}$ is 1.4522–1.4542.

*Example 5*

1,6-bis(1-boracycloheptyl)hexane

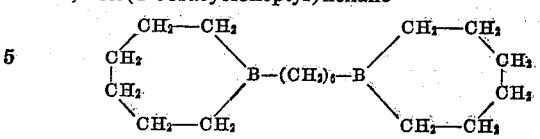

is prepared from biallyl, also known as 1,5-hexadiene by a procedure similar to that described in Example 1 for 1,4-bis(1-boracyclopentyl)butane except that the diborane is reacted with the diene at 22.5–30.5° C. instead of 2 to 10.5° C.

24.6 grams of biallyl is reacted with 2.77 grams of diborane generated by mixing 180 milliliters of 1.0 M sodium borohydride solution with 23.4 grams of boron trifluoride:diethyl ether complex in 50 milliliters of the dimethyl ether of diethylene glycol. 27.2 grams of the organoborine is obtained as a pale yellow liquid, B.P. 132° C. (1 mm. Hg).

27.4 grams of this organoborine is dissolved in 125 milliliters of ethanol containing 8.0 grams of sodium hydroxide. Over a 4.5-hour period 81.6 grams of 30% hydrogen peroxide solution is introduced with stirring. 17.8 grams of 1,6-hexanediol, B.P. 114–118° C. (3 mm. Hg), is obtained by a procedure similar to that described in Example 1.

*Example 6*

1,4-bis(1-bora-3-phenylcyclopentyl)-2-phenylbutane

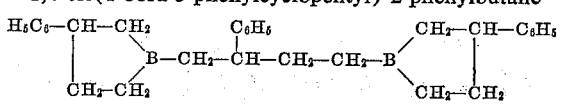

is made from 2-phenyl-butadiene-1,3 by a procedure similar to that described in Example 1 for 1,4-bis(1-boracyclopentyl)-butane except that the diborane is reacted with the diene at 18 to 28° C. instead of 2 to 10.5° C. and nitrogen is used in place of argon.

13 grams of 2-phenyl-butadiene-1,3 is reacted with 0.87 gram of diborane generated by mixing 70 milliliters of a 1.0 M sodium borohydride solution and 12 milliliters of borontrifluoride:diethyl ether complex in 10 milliliters of the dimethyl ether of diethylene glycol. 15.2 grams of the organoborine is obtained. It is a low-melting solid which readily dissolves in common organic solvents (e.g. benzene, pentane, diethyl ether, and ethanol) and burns with a green flame.

15.2 grams of this organoborine is dissolved in 42 milliliters of ethanol containing 2.7 grams of sodium hydroxide. Over a half-hour period 27.2 grams of 30% aqueous hydrogen peroxide is introduced with stirring; 5.44 more grams of peroxide solution is finally added to get the mixture to display a positive starch iodide test. 9.6 grams of 2-phenyl-1,4-butanediol, B.P. 85–87° C. (1 mm. Hg), M.P. 69–70° C., is obtained after decantation of the solution from the white precipitate which forms, washing of the precipitate with ether, combination of the ether with the solution, drying of the combined organic layers over anhydrous MgSO$_4$, and concentration under vacuum.

*Example 7*

1,4-bis(1-bora-3,4-diphenylcyclopentyl)-2,3 - diphenylbutane

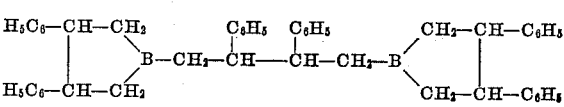

is made from 2,3-diphenylbutadiene-1,3 by a procedure similar to that described in Example 1 for 1,4-bis(1-boracyclopentyl)-butane except that the diborane is reacted with the diene at 21–30.5° C. instead of 2 to 10.5° C. and nitrogen is used instead of argon.

20.6 grams of 2,3-diphenyl-1,3-butadiene is reacted with 0.87 gram of diborane generated by mixing 70 milliliters of 1.0 M sodium borohydride solution and 12 milliliters of borontrifluoride:diethyl ether complex in 10 milliliters of diethylene glycol. 20.0 grams of the organoborine is obtained. It is a very viscous syrup which solidifies on cooling. It is soluble in common organic solvents (e.g. ether, pentane, benzene, and ethanol), fumes slightly in air, and burns with a green flame.

20.6 grams of the organoborine is dissolved in 42 milliliters of ethanol containing 2.7 grams of sodium hydroxide. 27.2 grams of 30% aqueous hydrogen peroxide is introduced with stirring over a half-hour period; an additional 5 milliliters is required to get a positive starch iodide test. The ethanolic solution is decanted from the white precipitate and concentrated under vacuum. The concentrate residue is taken up in 100 milliliters of water and the solution is thrice extracted with 100-milliliter portions of chloroform. The chloroform extracts are combined, dried over anhydrous sodium sulfate, and concentrated to give a sticky syrup which when crystallized from benzene yields 11.6 grams of 2,3-diphenyl-1,4-butanediol, M.P. 136.5–137.7° C.

As many widely different embodiments of this invention may be made without departing from the spirit and scope thereof, it is to be understood that this invention is not limited to the specific embodiments thereof except as defined in the appended claims.

What is claimed is:
1. An organoborine of the formula

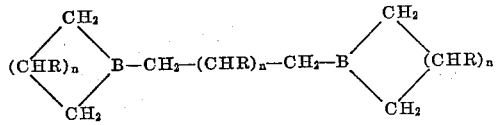

wherein R is a radical selected from the group consisting of hydrogen, alkyl and aryl and $n$ is an integer from 2 to 4.

2. 1,4-bis(1-boracyclopentyl)butane.

3. 1,4 - bis(1 - bora - 3-methylcyclopentyl)-2-methylbutane.

4. A process for preparing an organoborine of the formula

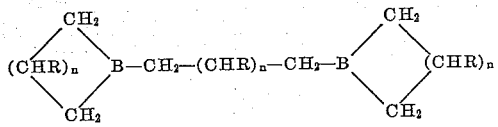

wherein R is a radical selected from the group consisting of hydrogen, alkyl and aryl and $n$ is an integer from 2 to 4, which comprises reacting an alkadiene of the formula $$CH_2=CR—(CHR)_m—CR=H_2C$$

wherein R is a radical as defined above and $m$ is an integer from 0 to 2, with diborane, in the presence of an ether selected from the group consisting of a dialkyl ether and a cyclic alkylene ether, in an inert solvent at a temperature greater than about —20° C.; with the proviso that the molar ratio of alkadiene to diborane be at least about 3:1 and the molar ratio of said ether to diborane at least about 2:1, and recovering the resulting organoborine thus produced.

5. A process according to claim 4 wherein the ether is diethyl ether.

6. A process according to claim 4 wherein the alkadiene is butadiene-1,3.

7. A process according to claim 4 wherein the alkadiene is isoprene.

References Cited in the file of this patent

Brown et al.: J. Org. Chem., vol. 22, pp. 1136–7 (1957).